March 21, 1961 P. A. DODGE 2,976,475
ELECTRICAL SIGNAL REGULATOR
Filed April 8, 1957
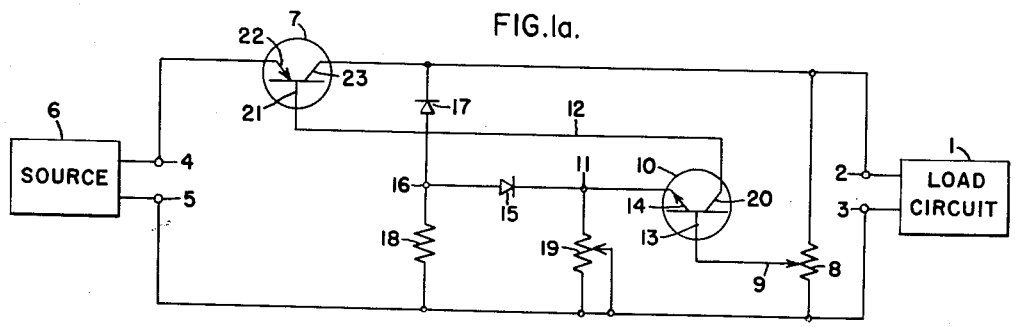
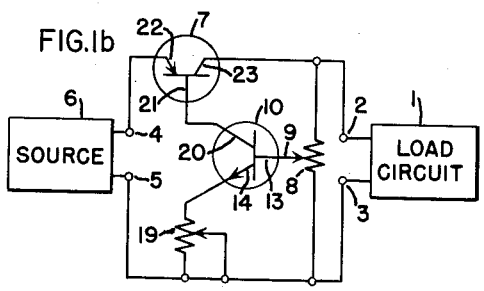
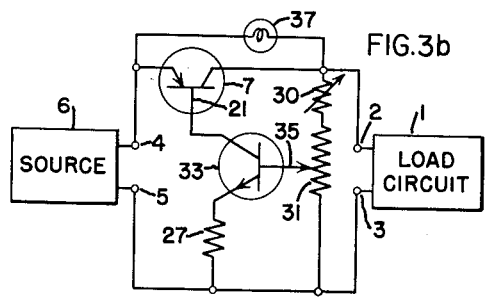
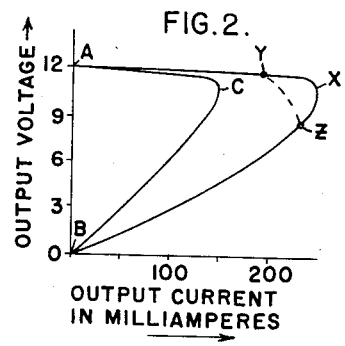
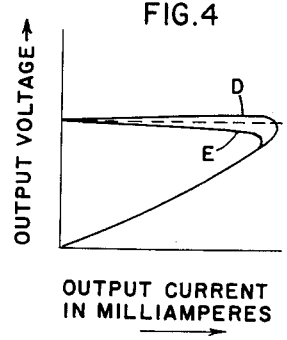
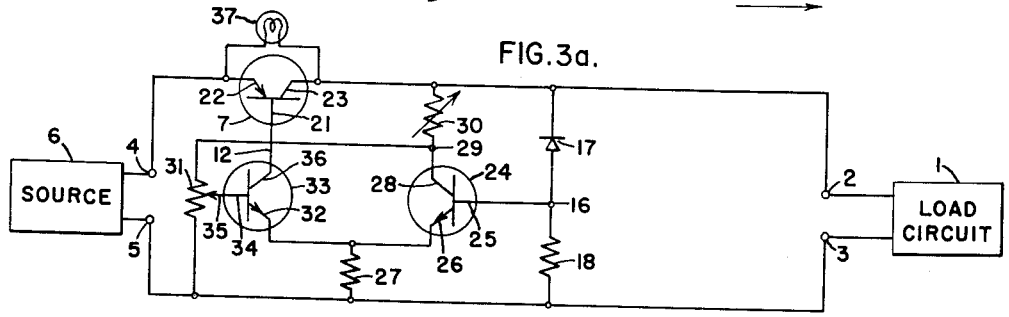
INVENTOR:
PAUL A. DODGE,
BY Michael Masnik
HIS ATTORNEY.

United States Patent Office 2,976,475
Patented Mar. 21, 1961

2,976,475
ELECTRICAL SIGNAL REGULATOR
Paul A. Dodge, Baldwinsville, N.Y., assignor to General Electric Company, a corporation of New York
Filed Apr. 8, 1957, Ser. No. 651,519
3 Claims. (Cl. 323—9)

My invention relates to regulating devices and more particularly to electrical signal regulators.

It is oftentimes desirable to control the voltage supplied from a source to a load circuit to within predetermined levels irrespective of variations in the source and the load circuit. Where the power to be applied to a load circuit is obtained from a source of poor regulation, it is common to employ a voltage regulator between the source and the load circuit to maintain the voltage at the load circuit substantially constant. Previous voltage regulators of this type have suffered from certain shortcomings. To insure proper output overload and input undervoltage protection it has been necessary in these prior art devices to employ fuses, relays and other objectionable circuit protective elements. Use of these devices was necessary since an unprotected regulator will suffer damage when subjected to an overload or undervoltage condition.

In the copending application of Paul A. Dodge, Serial Number 615,645, filed October 12, 1956, entitled Electronic Voltage Regulator and assigned to the same assignee as the present invention, a signal regulating arrangement is disclosed which overcomes the undesirable features of prior regulating arrangement which attempted to maintain a constant output voltage regardless of the excessive nature of the overload conditions. This tendency to continue regulation ultimately resulted in the destruction of the regulating arrangement itself. Briefly, the aforesaid copending application discloses an arrangement for detecting and signalling the approach of an overload condition. This signal causes the regulating arrangement to cease its normal operation and become effectively a high impedance thereby preventing any damage to the overall circuitry.

The present invention is an improvement over prior regulating arrangements in that an improved transition from normal regulation to the overload protective state is achieved. Also, the present invention provides means for adjusting the output impedance to a positive or negative value in the normal regulation region. The present invention also provides an improved indication of the regulating circuit's operation from its normal to overload protection states, as well as an indication of the input voltage conditions.

It is, therefore, an object of my invention to provide a new and improved electrical signal regulator.

It is another object of my invention to provide a new and improved signal regulator capable of satisfactory performance over wide operating conditions.

It is a further object of my invention to provide an improved overload and/or undervoltage protection for electrical circuits.

It is a further object of my invention to provide an improved signal processing arrangement.

It is a further object of my invention to provide an improved transition of a signal regulating arrangement from its normal regulating state to its overload protective state.

It is also an object of my invention to provide an improved arrangement for controlling the output voltage being delivered to a load circuit under varying load circuit conditions.

It is a further object of my invention to provide a continuous indication of the controlling operations of a signal regulating arrangement.

It is a further object of my invention to provide an improved arrangement for indicating the operating condition of a regulating circuit from its normal regulating state through overload and also an indication of input voltage conditions.

For a better understanding of my invention, reference is made to the following description taken in connection with the accompanying drawings and the appended claims, wherein Fig. 1a illustrates in circuit diagram form a transistorized embodiment of the present invention.

Fig. 1b illustrates in circuit diagram form an equivalent representation of the invention referred to in Fig. 1a when under overload conditions, Fig. 2 illustrates in graphic form the operating characteristics of a desirable voltage regulating arrangement, Fig. 3a illustrates in circuit diagram form a further embodiment of the present invention, Fig. 3b illustrates in circuit diagram form an equivalent representation of the invention referred to in Fig. 3a when under overload conditions, and Fig. 4 illustrates in graphic form certain preferred characteristics of the present invention.

Referring now to Fig. 1a there is shown an output or load circuit 1 having its input terminals 2 and 3 connected through a circuit arrangement to the output terminals 4 and 5 of a source of unregulated unidirectional or undulating D.C. voltage 6. In order to maintain a substantially constant voltage across terminals 2 and 3 which is independent of variations in the load circuit 1 impedance and the source 6 voltage, a signal regulating arrangement is provided. This regulating arrangement comprises a variable impedance 7, placed between the source output terminal 4 and the load input terminal 2, which is made responsive to the variations in the voltage developed across the load sensing resistor 8 in a manner to cause the voltage developed across resistor 8 to be kept constant. To accomplish this, a portion of the voltage developed across the load sensing resistor 8 is selected by the movable tap 9 and applied to the comparator and amplifier circuit 10. The comparator and amplifier compares the voltage signal selected by the movable tap 9 with a fixed reference voltage signal provided at the junction point 11 in a manner to be described shortly. The result of this comparison is to provide a suitable signal over lead 12 to the variable impedance 7 causing the impedance of device 7 to change in the proper direction to maintain the voltage developed across resistor 8 constant.

In a typical operation, should the voltage developed across resistor 8 increase, a signal is developed over lead 12 causing the variable impedance device 7 to increase and return the voltage across 8 to its desired level. Similarly, if the voltage across resistor 8 should decrease, a signal is developed at lead 12 causing the impedance of device 7 to decrease and therefore return the voltage developed across 8 to its normal desired level.

Referring to Fig. 2 there is shown graphically a voltage regulating characteristic wherein the current developed in the load circuit is plotted as abscissa and the voltage developed across the load circuit is plotted as ordinate. In the normal case, a voltage regulating circuit attempts to maintain a constant output voltage with increased load current. Without suitable protection a point is ultimately reached where the load current becomes so excessive that the normal regulating arrangement would be destroyed. Where the concern is excessive load current or excessive power dissipation in the regulating circuit, it would be desirable to provide a voltage regulating characteristic which would function at a maximum predetermined load current condition, such as at X, to return the output voltage to a sufficiently low level as shown by the curve AXB if loading beyond point X is attempted.

In the aforementioned copending application, an arrangement for providing such a desirable feature is disclosed. However, in order to establish a maximum available load current at point X, it was necessary to cease normal regulating function at some point for example Y, in order that a transition from regulation to overload protection could be accomplished without exceeding the maximum load current. The dotted curve YZ indicates such a possible transition.

The present invention as shown in Fig. 1 permits extension of the regulating region of the voltage regulator out closer to the maximum current condition X, as for example the curve AXB of Fig. 2. Generally the point X would correspond to the maximum power that could safely be dissipated within the regulating arrangement itself. The present invention therefore permits a greater range of regulation with the same components and permits closer operation to the maximum safe power level.

Reference is now made to Figs. 1a and 1b for a more detailed explanation of the present invention. Transistor 10 operating as a comparator and amplifier circuit has its base electrode 13 connected through the movable tap 9 on the output load voltage sensing resistor 8. Emitter electrode 14 is connected by means of the unidirectional conducting device 15, which may comprise a diode, to the junction 16 of a constant voltage reference element 17 and the reference load resistor 18. Reference element 17 may comprise, for example, a zener silicon diode. The circuit comprising elements 17 and 18 is connected between the output load terminals 2 and 3. Unidirectional conducting device 15 and the adjustable resistor 19 are connected between junction 16 and the output terminal 3 with the intermediate junction point 11 connected to the emitter electrode 14. The collector electrode 20 is connected to the base electrode 21 of the transistor 7 over lead 12. Transistor 7 has its emitter electrode 22 connected to the terminal 4 of the source 6 and its collector electrode connected to the output load terminal 2. The emitter-collector circuit of transistor 7 is therefore connected in series between the source 6 and the load circuit 1. It should be noted that the reference symbols used for transistors 7 and 10 indicate that the transistor 7 is of the PNP type whereas transistor 10 is of the NPN type.

The circuit arrangement of Fig. 1a operates as follows:

If the voltage developed across the load sensing resistor 8 should increase due to any variation in the source 6 or the load circuit 1, the voltage change is reflected through operation of the constant voltage device 17, the reference load resistor 18 and the unidirectional conducting device 15 as a signal at the emitter electrode 14 of transistor 10. Since the voltage developed across the element 17 normally remains constant, due to its inherent nature of operation, any change in the voltage appearing at the terminal 2 appears in its entirety also at the emitter electrode 14. A portion of this increased voltage signal is developed at moveable tap 9 and applied directly to the base electrode 13 of device 10. Transistor 10 operates in response to the signals developed at its base electrode 13 and the emitter electrode 14 caused by an increase in voltage across the resistance 8 to provide an output signal in the form of a decreasing current flowing over lead 12 to the base electrode 21. Similarly, if the voltage developed across resistor 8 should decrease, the decrease appears in its entirety at the emitter electrode 14 and only a portion of this decrease is applied to the base electrode 13. This results in an increase in base current flowing over lead 12 to the base electrode 21. Since the effective impedance of transistor 7 is controlled by the signal current applied to the base electrode 21, a regulating action is obtained. Thus, an increasing control signal applied to base electrode 21 causes the effective impedance of device 7 to decrease, thereby causing the voltage across resistor 8 to increase to its normally desired level. If the decreasing control signal is applied to the base electrode 21 of device 7, this results in an increase in the effective impedance, thereby causing the voltage to develop across load resistor 8 to decrease to its normal operating level. Thus far, the circuit arrangement of Fig. 1a has been defined as operating to provide the desired regulating control over the voltage applied to the load circuit 1.

The arrangement of Fig. 1, while providing the desired regulating feature, also operates to prevent the regulating feature from being continued beyond the maximum safe load current value. Briefly, the circuit arrangement of Fig. 1a operates to provide an overall control feature as identified by the characteristic curve AXB of Fig. 2. The arrangement of Fig. 1a provides suitable regulation in the form of a substantially constant output voltage out to a point X, corresponding to a maximum output load current level. At this point it is desired to prevent any further tendency of the regulating arrangement to maintain the output voltage constant and thereby avoid destruction of the regulating system. To this end, adjustable resistor 19 and the unidirectional conducting device 15 which may comprise a semiconductor diode, are dimensioned and positioned in the overall regulating circuit to provide an overload or undervoltage protective feature. The potential at junction 11 is determined by the current flowing from the base electrode 21 through the collector-emitter circuit of transistor 10 to resistor 19 and also by the current flowing through the zener silicon diode 17, diode 15 and the resistor 19. For changes in the load voltage developed across terminals 2 and 3, the relative potential between junctions 16 and the movable tap 9 varies correspondingly. With an increase in the load circuit current the voltage at tap 9 becomes increasingly positive with respect to the potential developed at junction 16. This increasing voltage at tap 9 causes the emitter of transistor 10 to pass increasing current through the adjustable resistor 19. Ultimately this increasing current from emitter 14 raises the potential at junction 11 to a higher potential than that appearing at junction 16 thereby causing the diode 15 to be cut off and rendered nonconductive. This nonconduction point of diode 15 corresponds to the overload output current condition X shown in Fig. 2. Thus, it is the dimensioning of adjustable resistor 19 which establishes the maximum available load current.

For any action attempting to increase the output load current beyond value X, the potential at junction 11 remains more positive than that appearing at junction 16 such that the nonconduction of diode 15 effectively removes the Zener silicon diode 17 and associated load resistor 18 from affecting the regulating circuit operation.

Fig. 1b has been drawn to illustrate the operating condition of the regulating arrangement for a condition where diode 15 becomes nonconductive. Once the diode 15 of Fig. 1a has been rendered nonconductive at the predetermined maximum load current condition, any attempt to increase the load circuit current will produce a decrease in voltage at movable tap 9. This action causes a decreased voltage to be developed at emitter 14 and therefore a decrease in voltage across the adjustable resistor 19. This decreasing voltage across resistor 19 causes a corresponding decrease in the current from base electrode 21. The decrease in the base electrode current causes the impedance of transistor 7 to increase thereby causing the output voltage developed between terminals 2 and 3 to decrease even further. Thus, once the maximum load current condition is exceeded, the output voltage falls rapidly for any further decrease in load resistance. If the load condition should correct itself and normal load conditions established across the output terminals 2 and 3, a reverse process takes place with the result that the output voltage is returned to its normally operating level along the curve BXA of Fig. 2.

The circuit arrangement of Fig. 1 is easily adaptable to provide the combination of a regulating function and a protective function for various maximum load current conditions. By increasing the value of resistor 19, the characteristic curve of the regulating arrangement of Fig. 1a may be modified from the curve AXB to another curve, such as ACB. This simple control permits continuous adjustment of the maximum available load current to selectively accommodate a plurality of varying load circuit conditions.

In accordance with a further embodiment of the present invention, a regulating arrangement is provided which permits improved control over the output load voltage in the normal regulating region. Referring to Fig. 3a there is shown a circuit arrangement which provides a selectable regulating characteristic, that is, output voltage can be made to either rise or fall with increasing load current. Wherever possible elements common to Figs. 1a and 3a have been retained in 3a for purposes of simplifying the discussion. Referring to Fig. 3a the circuit comprising the diode 15 shown in Fig. 1 is replaced with a transistor 24 having its base electrode 25 connected to junction 16 and its emitter electrode 26 connected through the load resistor 27 to the output terminal 3 of the load circuit 1. The collector electrode 28 is connected to junction 29 of a resistor network comprising resistances 30 and 31 connected across the output terminals 2 and 3. The emitter electrode 26 is also connected to the emitter electrode 32 of the transistor device 33. The base electrode 34 is connected by movable tap 35 to a point on the resistor 31. The collector electrode 36 is connected over lead 12 to the base electrode 21 of transistor 7. The circuit comprising transistors 24 and 33 is connected such that the collector current of transistor 33 is made proportional to the relative potential between movable tap 35 and junction 16 to provide the desired regulating characteristic. The arrangement of Fig. 3a operates as follows. If the voltage developed across the terminals 2 and 3 should increase due to any variation in the source 6 or the load circuit 1, the potential at junction 16 increases correspondingly in a manner previously described with respect to the constant reference voltage element 17 and the load resistor 18. This increase in potential at junction 16 and therefore at base electrode 25 of the device 24 causes an increased current to flow through resistor 27 thereby raising the potential at the emitter electrode 32. This increase in potential results in a tendency to decrease the collector current flowing over lead 12 to the base electrode 21. This decreasing current at base electrode 21 results in an increase in the effective impedance of the emitter-collector circuit of transistor 7, thereby causing the voltage at the output terminals 2 and 3 to decrease to a desired level. The degree of compensation possible can be gleamed by reference to Fig. 4 wherein output voltage is plotted as ordinate and output current as abscissa. This compensation of output voltage for load current changes, with the circuit arrangement of Fig. 3a, can be varied to provide overcompensation as shown by curve D of Fig. 4 or undercompensation as shown at curve E of Fig. 4. This is made possible in the following manner. The decrease in current on lead 12 which controls the output voltage developed at output terminals 2 and 3 depends not only upon the control signal developed across resistor 27 in response to a change in potential at junction 16, but also upon the potential developed at movable tap 35 which is connected to the resistance network 31 and 30 appearing across the output load terminals. With the circuit arrangement shown, the collector current for device 24 flows through the resistor 30 and modifies the fractional part of the voltage change developed across terminals 2 and 3 which is caused to appear across the resistor 31. It should be noted that the device 33 receives a portion of the increased voltage appearing across terminals 2 and 3 at its base electrode 34 over movable tap 35. This increase in voltage at the base electrode 34 for an increase at the output terminals 2 and 3 can be partially or more than totally compensated for by controlling the effect of collector current flowing from device 24 through the load resistor 30. Thus, if we make the value of the load resistance 30 large we achieve overcompensation as shown by curve D of Fig. 4. Whereas if we adjust the resistance 30 to be small, we achieve undercompensation as shown at E of Fig. 4. Thus far the circuit arrangement of Fig. 3a has been shown to be capable of providing different degrees of regulation, from overcompensation to undercompensation, by adjustment of a simple control.

The circuit arrangement of Fig. 3a provides an overload protective feature in the following manner. The operating condition of device 24 is determined by the relative potential existing at its base electrode 25 connected to junction 16, and the potential across resistor 27 due to the potential at the movable tap 35. The resistor is adjusted such that, at the maximum load condition, device 33 conducts sufficient current through resistor 27 such that the potential at emitter 26 is raised sufficiently to render transistor 24 non-conducting. With the device 24 nonconducting, the circuit arrangement of Fig. 3a can be redrawn as that shown in Fig. 3b. In a manner previously described with respect to Fig. 1b, any further attempted increase in loading decreases the base current appearing at base electrode 21 thereby increasing the effective impedance device 7 and reducing the output voltage to the desired low protective level.

If the load condition should correct itself and a normal load impedance again appear across load terminals 2 and 3, a reverse process takes place to re-establish the load voltage at its normal level. Figure 3b shows that, as the load voltage starts to increase, the potential at tap 35 rises causing transistor 33 to increase its collector current being drawn from base 21 of the variable impedance transistor 7. This increase in base current causes device 7 to become a lower impedance, thus increasing the load voltage even further. In this manner, recovery from overload conditions is achieved.

Device 37 is a visual indicator intended for indication of various circuit operating conditions. Device 37 is connected between source terminal 4 and load terminal 2, being effectively in parallel with the variable impedance device 7. Thus the voltage appearing across indicator 37 is determined by the difference in potential between source terminal 4 and load terminal 2. By using for instance a properly dimensioned incandescent lamp for 37, this lamp will glow dimly if the overall regulating arrangement is working properly. Lamp 37 will glow brightly if the regulating arrangement is in its overload state, and will be completely extinguished if the source voltage between terminals 4 and 5 is abnormally low or absent completely. Thus the state of circuit operation is instantly visible.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a source of a direct current, a load circuit, a variable resistance device comprising a control element connected between said source and said circuit, a signal comparator comprising a first, second and third control electrode, a reference voltage device and an impedance element connected in series across said load circuit, means for maintaining the potential of said one electrode substantially constant comprising a unidirectional conducting device connected to the junction of said reference voltage device and said impedance element and comprising a load circuit connected to said one electrode, means for applying a signal to the second of said electrodes which varies in accordance with the voltage developed in said load circuit in response to current flow from said source to said load circuit, means responsive to a predetermined current flowing through said first electrode corresponding to load circuit impedance values below a predetermined minimum value for rendering said unidirectional conducting device nonconductive, and means responsive to a change in current flowing through said first electrode in response to said unidirectionally conducting device becoming nonconductive for applying a signal to said control element to cause said variable resistance device to abruptly assume a high value of resistance.

2. In combination, a source of electrical signal, a load circuit, means for supplying signals from said source to said load circuit comprising a regulating device connected in series between said source and load circuit, a source of a reference signal, means responsive to relative changes of a signal developed in said load circuit and said reference potential for controlling said regulating device, means responsive to a predetermined maximum difference of said developed and reference signals indicative of an abnormal load condition for causing said regulating device to become a high resistance, and means for indicating a reduction in the amplitude of the signals available from said source, the high resistance condition of said regulating device, and the normal regulation of said regulating device comprising an indicator connected across said regulating device.

3. In combination, a source of direct current, a load circuit, a variable resistance device comprising first, second and third electrodes, said first and second electrodes being connected in series between said source and said load circuit, a source of reference voltage, a switching device responsive to the relative potential of said reference source and a voltage developed in said load circuit as the result of current flow from said source to said load circuit to provide two ranges of control, said switching device operative within a first range of control to cause the resistance of said regulating device to change in a predetermined manner with changes in the value of load circuit impedance over a normal range of values, said switching device operative within a second range of control to cause the resistance of said regulating device to change abruptly to a high level when said load circuit impedance falls below a value outside said normal range of values, and to return the value of said resistance to a value within said first range of control in response to said load circuit impedance returning to its normal range of values.

References Cited in the file of this patent

UNITED STATES PATENTS

| | | |
|---|---|---|
| 2,697,811 | Deming | Dec. 21, 1954 |
| 2,776,382 | Jensen | Jan. 1, 1957 |
| 2,832,900 | Ford | Apr. 29, 1958 |